United States Patent
Tsirkin (10) Patent No.: US 12,248,791 B2
(45) Date of Patent: *Mar. 11, 2025

(54) PROVIDING A CAPTIVE PORTAL TO MANAGE A DRIVER APPLICATION FOR A PERIPHERAL DEVICE

(71) Applicant: RED HAT, INC., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,943

(22) Filed: Nov. 20, 2023

(65) Prior Publication Data
US 2024/0095040 A1 Mar. 21, 2024

Related U.S. Application Data

(63) Continuation of application No. 16/788,865, filed on Feb. 12, 2020, now Pat. No. 11,822,931.

(51) Int. Cl.
| | | |
|---|---|---|
| G06F 9/44 | (2018.01) | |
| G06F 9/4401 | (2018.01) | |
| G06F 13/10 | (2006.01) | |
| H04L 67/00 | (2022.01) | |
| H04L 67/63 | (2022.01) | |

(52) U.S. Cl.
CPC .......... *G06F 9/4411* (2013.01); *G06F 13/102* (2013.01); *H04L 67/34* (2013.01); *H04L 67/63* (2022.05)

(58) Field of Classification Search
None
See application file for complete search history.

(56) References Cited

U.S. PATENT DOCUMENTS

| | | |
|---|---|---|
| 9,547,499 B2 * | 1/2017 | Lenart .................. G06F 9/4411 |
| 10,248,363 B2 | 4/2019 | Smith et al. |
| 10,382,305 B2 | 8/2019 | Alam et al. |
| 2002/0083228 A1 | 6/2002 | Chiloyan et al. |
| 2003/0220988 A1 | 11/2003 | Hymel |

(Continued)

FOREIGN PATENT DOCUMENTS

JP 6139030 B2 5/2017

OTHER PUBLICATIONS

Final Office Action for U.S. Appl. No. 16/788,865, mailed Apr. 19, 2023, 11 Pages.

(Continued)

*Primary Examiner* — Craig C Dorais
(74) *Attorney, Agent, or Firm* — Dority & Manning, P.A.

(57) ABSTRACT

Aspects of the disclosure provide for mechanisms providing a captive portal to manage a driver application for a peripheral device. Systems and methods of the disclosure include: providing, by a client device, a first request for a connection with a peripheral device over a wireless network provided by the peripheral device; receiving a message granting the connection to the wireless network; providing a second request to access a first web page at an address; receiving a second web page associated with a driver application for the peripheral device instead of the first web page; and launching the driver application by using a first link that facilitates an installation of the driver application and a second link that launches the driver application.

20 Claims, 6 Drawing Sheets

(56) References Cited

U.S. PATENT DOCUMENTS

| | | |
|---|---|---|
| 2005/0160157 A1* | 7/2005 | Collier .................. G06F 9/4413 717/176 |
| 2016/0371201 A1 | 12/2016 | Crews et al. |
| 2019/0104411 A1 | 4/2019 | Hotchkiss et al. |
| 2019/0116289 A1 | 4/2019 | Kawasaki |
| 2021/0247988 A1 | 8/2021 | Tsirkin |

OTHER PUBLICATIONS

Non-Final Office Action for U.S. Appl. No. 16/788,865, mailed Oct. 7, 2022, 11 Pages.
Notice of Allowance for U.S. Appl. No. 16/788,865, mailed Jul. 11, 2023, 8 Pages.
Notice of Allowance for U.S. Appl. No. 16/788,865, mailed Oct. 12, 2023, 3 Pages.
wi-fi.org: "Portable Wi-Fi That Goes With You Anywhere," Wi-Fi Alliance, 2015-2018, 4 Pages, Copyright 2019, Retrieved from URL: https://www.wi-fi.org/discover-wi-fi/wi-fi-direct.
Zeroshell: "Zeroshell Linux Router: Routing and Bridging Firewall Solutions," Hotspot Using Captive Portal, 18 Pages, [Retrieved on Sep. 30, 2019] Retrieved from URL: https://zeroshell.org/hotspot-router/.

\* cited by examiner

PROVIDING A CAPTIVE PORTAL TO MANAGE A DRIVER APPLICATION FOR A PERIPHERAL DEVICE

RELATED APPLICATIONS

This application is a continuation of U.S. patent application Ser. No. 16/788,865, filed Feb. 12, 2020, the entire contents of which is incorporated by reference herein.

TECHNICAL FIELD

The implementations of the disclosure generally relate to computer systems and, more specifically, to systems and methods for providing a captive portal to manage a driver application for a peripheral device.

BACKGROUND

A peripheral device can be wirelessly connected to a client device through peer-to-peer communication (e.g., using a Wi-Fi Direct standard), without requiring a wireless access point or a wireless router. For example, a printer itself can function as an access point to provide a wireless network. Accordingly, any devices within a range covered by the wireless network supported by the printer can directly communicate with the printer without requiring a wireless access point. When communicating with the printer, a mobile phone, for example, should convert data for a printing operation into a format compatible with the printer by using a driver application for the printer.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Described herein are systems and methods of providing a captive portal to manage a driver application for a peripheral device. A peripheral device herein refers to a device that is externally connected to another device and performs an input operation and/or an output operation upon receiving a request from the connected device. Examples of a peripheral device may include, for an input operation, a mouse, keyboard, graphics tablet, image scanner, barcode reader, game controller, light pen, light gun, microphone, digital camera, webcam, dance pad, and read-only memory; for an output operation, a printer, computer monitor, projector, headphones, computer speaker; and for an input and output operation, a disk drive, USB flash drive, memory card and tape drive.

A peripheral device and a client device can wirelessly be connected with each other without requiring a wireless access point. For example, the two devices can have a direct Wi-Fi wireless communication when one of the devices, such as the peripheral device, includes a software access point or an access point interface that enables the peripheral device to function as an access point and communicate based on a Wi-Fi Direct standard.

In order to operate the peripheral device, the client device typically should download and install a driver application for the peripheral device. A driver application is a software application that converts any data communicated between the peripheral device and the client device into a proper format for the respective device to understand. The client device can download the driver application from a web page of an application marketplace or a peripheral device's manufacturer. The application marketplace web page can be a web page associated with a database of applications that can be queried and downloaded. The web page can be supported by a web browser application. The client device can also download the driver application from a mobile application for the application marketplace. A mobile application is a software application designed to be executed on a portable device such as a phone, tablet, watch, or laptop computer. When searching for a driver application through such a web page or mobile application, there may not be a clear indication of which application is the proper and legitimate application for the peripheral device. Accordingly, the client device may be prone to downloading and installing an application that disguises as a legitimate application by using an icon or a name that is similar to the legitimate application and that compromises security of information stored on the client device.

Aspects of the present disclosure address at least the above noted issues by providing systems and methods that use a captive portal to manage a driver application for a peripheral device. A captive portal can be a web page that automatically opens in a web browser application at the client device when first connected to a network, or that opens when the web browser application is executed (e.g., when a user of the client device opens a web browser application and tries to visit a web page) before the client device can freely retrieve data through the network. In one implementation, when a client device is first connected to a wireless network supported by a peripheral device, the client device can be redirected to a captive portal that includes a link for installation of a driver application. Via the provided link, the client device can access the proper driver application for the peripheral device. Therefore, advantages of the present disclosure include, but are not limited to the improved security in installing downloaded applications and saving processing resources for searching for the proper driver application associated with the peripheral device. In another implementation, the peripheral device can also redirect the client device to a captive portal that includes a link for launching a driver application already installed at the client device. Using this link, the client device can invoke the already-installed driver application. Accordingly, the driver application can be kept turned off when not in use and executed when needed. As a result, any processing resources at the peripheral device, as well as any processing resources of the client device that are required to keep the driver application running may be saved.

Figure 1:
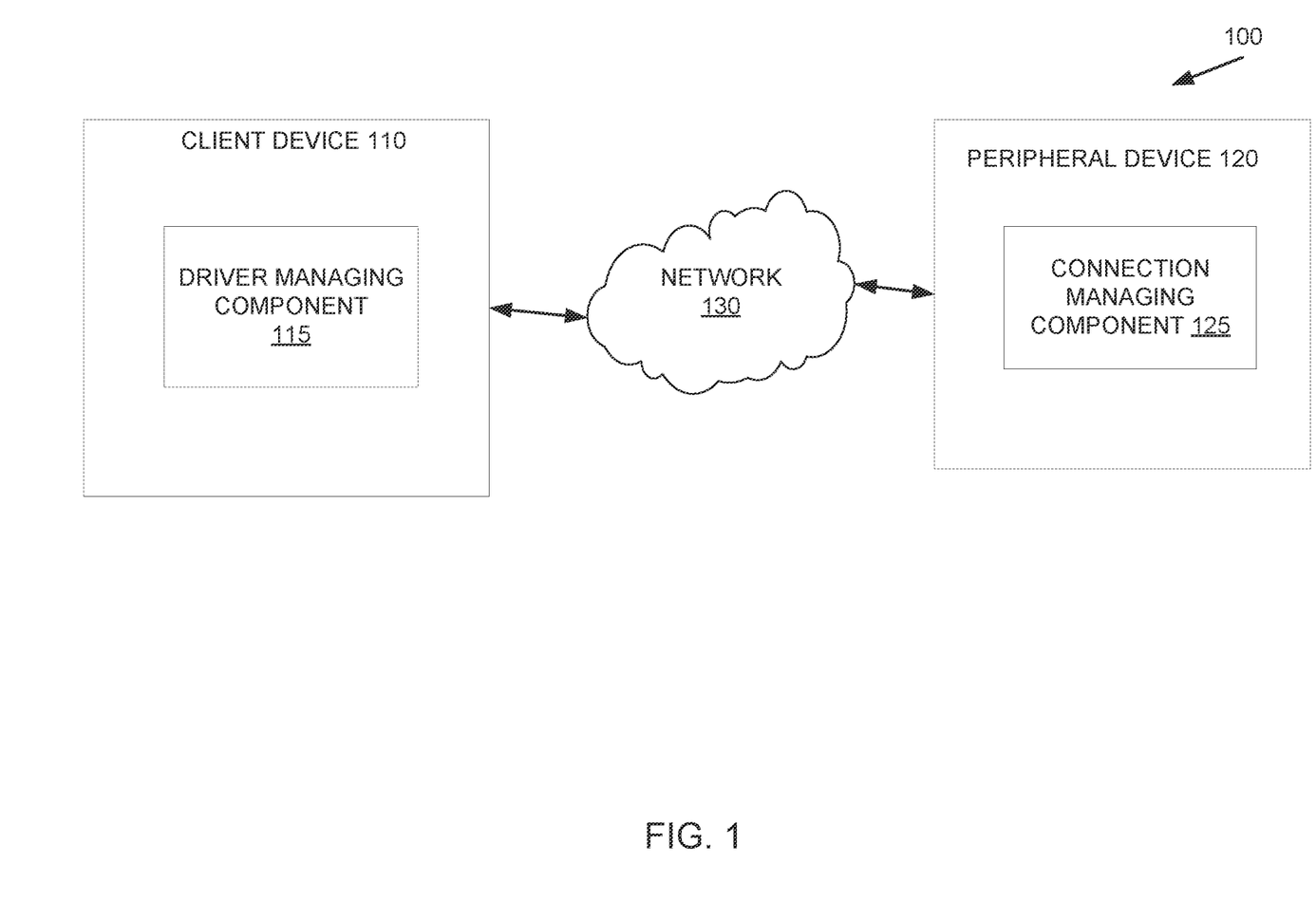
FIG. 1 is a block diagram that illustrates a sample computing environment for managing a driver application for a peripheral device in accordance with one or more aspects of the present disclosure.

FIG. 1 is a block diagram that illustrates a sample computing environment 100 for managing a driver application for a peripheral device in accordance with one or more aspects of the present disclosure. The computing environment 100 may include a client device 110, a peripheral device 120, and a wireless network 130. The wireless network 130 can be a peer-to-peer network where a wireless access point or a wireless router is not needed. The peer-to-peer network can be implemented with Wi-Fi Direct standards or any other standards (e.g., Bluetooth or near-field communication (NFC) standard) for peer-to-peer communication.

The client device 110 can include one or more processing devices communicatively coupled to memory devices and I/O devices. The client device 110 may be a laptop computer, tablet computer, mobile phone (e.g., smartphone), or any suitable computing device. The client device 110 may each include a web browser application and/or a client application (e.g., a mobile application or a desktop application). The client device 110 can download and install a driver application via the web browser or a mobile application.

Moreover, the client device 110 can request operations to be performed at the peripheral device 120 in accordance with the driver application. In other words, a driver application can be a software application that enables the client device 110 to request a respective peripheral device 120 to perform an operation (e.g., an input and/or output operation) by converting data being communicated between the client device 110 and the peripheral device 120 to a format that is compatible with the respective device (either the client device 110 or the peripheral device 120). In one implementation, the client device 110 can request a printing operation to be performed by the peripheral device 120 using a web page or an interface provided by the driver application. The client device 110 can also transmit a text or an image file for the printing operation to the peripheral device 120 via the driver application. For example, the driver application can convert the request and the associated file (e.g., the text or image requested to be printed) to another data having a format that the peripheral device 120 can understand. Subsequently, the driver application of the client device 110 can transmit the converted data to the peripheral device 120 over the wireless network 130.

In addition, the client device 110 can include a driver managing component 115 that manages installation and execution of a driver application for the peripheral device 120 by communicating with the peripheral device 120. For example, the driver managing component 115 can utilize a web browser application or a mobile application to download and execute the driver application based on a captive portal provided by the peripheral device. Further details of the driver managing component 115 will be described below with respect to FIG. 2B.

The peripheral device 120 can include one or more processing devices communicatively coupled to memory devices. Moreover, the peripheral device 120 can include an input and/or output device to provide a service to the client 110 as requested. Examples of the peripheral device 120 including the input device can be a wireless mouse, keyboard, graphics tablet, image scanner, barcode reader, game controller, light pen, light gun, microphone, digital camera, webcam, dance pad, and read-only memory. As for the peripheral device 120 including the output device, examples can include a wireless printer, computer monitor, projector, headphones, and computer speaker. The peripheral device 120 having the input and output devices can be a disk drive, USB flash drive, memory card, or tape drive.

Moreover, the peripheral device 120 can include a connection managing component 125 to manage the wireless connection with the client device 110 over the wireless network 130. In particular, the connection managing component 125 can manage contents of outbound communication to the client device 110 to facilitate installation and execution of a driver application at the client device 110. The connection managing component 125 will be described in more details with respect to FIG. 2A below.

Figure 2A:
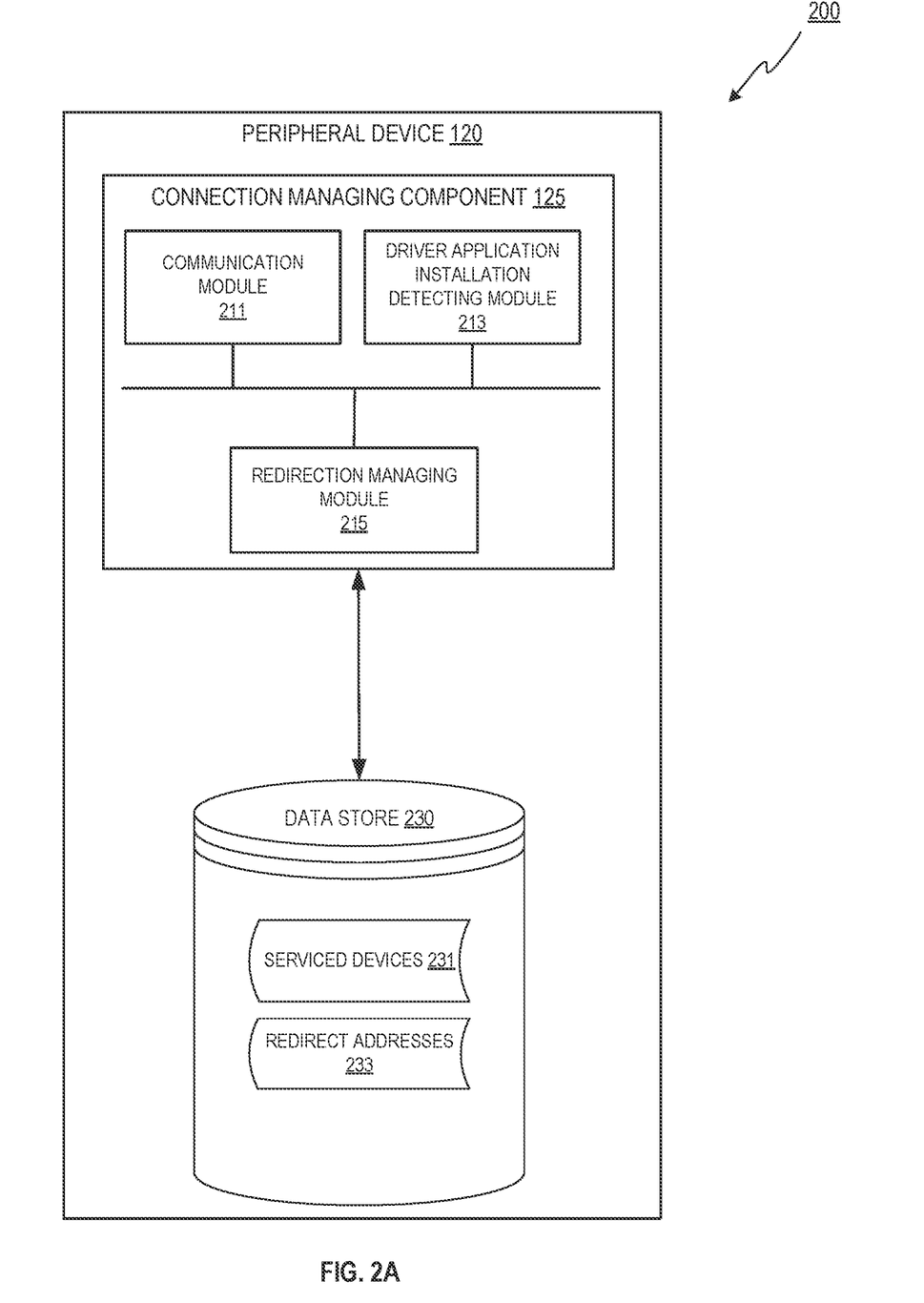
FIG. 2A depicts a block diagram illustrating an example of the peripheral device in accordance with some examples of the disclosure.

FIG. 2A depicts a block diagram illustrating an example 200 of the peripheral device 120 in accordance with some examples of the disclosure. The peripheral device 120 can include the connection managing component 125 and a data store 230.

As illustrated, the connection managing component 125 can include a communication module 211, a driver application installation detecting module 213, and a redirection managing module 215. The connection managing component 125 can communicate with the data store 230 that stores a list of serviced devices 231 (e.g., a list of client devices that have requested the peripheral device 120 to perform an operation using the driver application—in a form of a database table) and redirect addresses 233 to redirect the client device 110 to a web page (e.g., a captive portal) for downloading the driver application or invoking the driver application at the client device 110. Moreover, the redirect addresses 233 can correspond to an address of the driver application for launching the driver application. Furthermore, the data store 230 can additionally store a captive portal that includes a link to download the driver application and/or another link to launch the driver application at the client device 110.

The communication module 211 can enable the peripheral device 120 to function as an access point. Accordingly, the communication module 211 can support peer-to-peer communication by providing the wireless network 130. The communication module 211 can operate in accordance with Wi-Fi Direct standard or any other standards (e.g., Bluetooth or near-field communication (NFC) standard) for the peer-to-peer communication without requiring a wireless access point or a wireless router. In some implementations, the communication module 211 can receive a request to establish a connection over the wireless network 130 from the client device 110. In one implementation, the connection request can include an identifier (e.g., a MAC address of the client device or any other unique identifier) of the client device 110. In response, the communication module 211 can transmit a response agreeing to the direct communication with the client device 110 over the wireless network 130.

The communication module 211 can also receive a request to access a web page from the client device 110 after the connection with the client device 110 is established. Such a request can include the web address in a form of a Uniform Resource Locator (URL). In response to receiving the access request, the communication module 211 can retrieve an address of the captive portal and transmit the address to the client device 110. In one implementation, the communication module 211 can provide a different address for invoking the driver application at the client device 110 depending on whether or not the driver application for the peripheral device 120—is installed at the client device 110, as directed by the redirection managing module 215. In one implementation, the communication module 211 can provide the received identifier to the driver application installation detecting module 213 and in turn, receive a redirect address from the redirection managing module 215. The redirect address can be different from the web address received as the indication of the request to perform the operation.

The communication module 211 can further receive instructions from the client device 110 in accordance with the driver application in order to execute an operation at the peripheral device 120. In one implementation, the instructions can also include the identifier of the client device 110. Upon receiving the identifier through the driver application, the communication module 211 can store the identifier to the list of serviced devices 231.

The driver application installation detecting module 213 can detect whether or not the driver application is installed the client device 110 based on the received identifier of the client device 110. In some implementations, the driver application installation detecting module 213 can access the list of serviced devices 231 and compare the received identifier against the serviced devices 231 to determine whether the client device 110 is included in the list of serviced devices 231. The list of serviced devices 231 can be updated when a new identifier of a device is received along with instructions converted by the driver application. Subsequently, the driver application installation detecting module 213 can notify the redirection managing module 215 whether or not the driver application is installed at the client device 110.

The redirection managing module 215 can determine a destination to which the client device 110 should be redirected based on the notification received from the driver application installation detecting module 213 regarding the installation of the driver application. In some implementations, the redirection managing module 215 can access the list of redirect addresses 233 to retrieve the appropriate redirect address. For example, in case the driver application is not installed at the client device 110, the redirection managing module 215 can provide a web address of the captive portal that includes a link associated with downloading a driver application from the list of redirect addresses 233. Accordingly, the redirection managing module 215 can provide, to the communication module 211, a link that facilitates installation of the driver application at the client device 110. In another example, instead of providing the web address of the captive portal, the redirection managing module 215 can provide the captive portal itself to the client device 110.

On the other hand, in case the driver application installation detecting module 213 determines that the driver application is already installed at the client device 110, the redirection managing module 215 can provide, to the communication module 211, an address of the driver application that launches the driver application. For example, the address of the driver application can cause the driver application to provide an interface for the client device to request the performance of an operation to the peripheral device 120. In another embodiment, the redirection managing module 215 can provide, to the communication module 211, an address of a web page of a cloud server for uploading data (e.g., a document to be printed, an audio or a video file to be played) associated with the request, regardless of whether or not the driver application is installed at the client device 110.

More or less components may be included without loss of generality. For example, two or more of the components or portions of the components may be combined into a single component, or one of the components may be divided into two or more modules. In one example, one or more of the modules may be executed by different processing devices on different computing devices (e.g., different server computers).

Figure 2B:
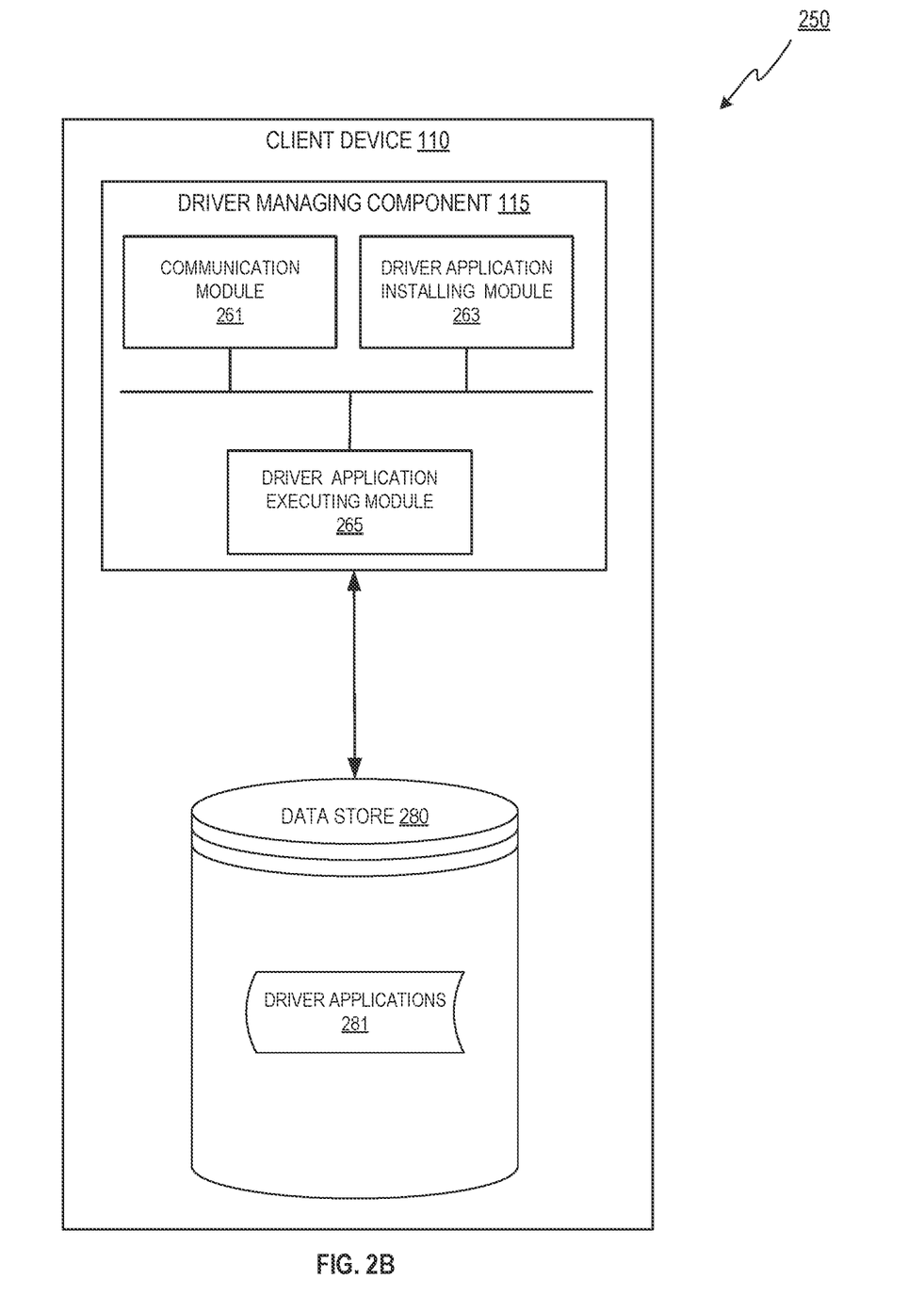
FIG. 2B depicts a block diagram illustrating an example of the client device in accordance with some examples of the disclosure.

FIG. 2B depicts a block diagram illustrating an example 250 of the client device 110 in accordance with some examples of the disclosure. The client device 110 can include the driver managing component 115 and a data store 280.

As illustrated, the driver managing component 115 can include a communication module 261, driver application installing module 263, and a driver application execution module 265. The driver managing component 115 can communicate with the data store 280 that stores software code of driver applications 281.

The communication module 261 can enable the client device 110 to wirelessly communicate with the peripheral device 120 over the wireless network 130 in accordance with Wi-Fi Direct standards or any other standards (e.g., Bluetooth or near-field communication (NFC) standard) for peer-to-peer communication supported by the peripheral device 120. In some implementations, the communication module 261 can transmit a request (e.g., a probe request) to establish connection over the wireless network 130 to the peripheral device 120. The connection request can include an identifier (e.g., a MAC address of the client device or any other unique identifier) of the client device 110.

In response, the communication module 261 can receive a response from the peripheral device 120 agreeing to the connection. The communication module 261 can transmit a request to access a web page after the connection is established between the client device 110 and the peripheral device 120. The request can be include a web address of a home page to be loaded as an initial web page when the web browser application of the client device is launched. In another example, the web address included in the request, can be an address of any web page provided by the peripheral device 120 when establishing a connection between the client device 110 and the peripheral device 120 over the wireless network 130. The web address can be in a form of a Uniform Resource Locator (URL).

Subsequently, the communication module 261 can receive a captive portal that includes a link for facilitating installation of a driver application at the client device 110 and/or a link for launching the driver application installed at the client device 110. In one implementation, the communication module 261 can receive the captive portal from the peripheral device 120 after receiving an address of the captive portal from the peripheral device 120 and requesting the captive portal to the peripheral device 120. In another implementation, the communication module 261 can be provided with the captive portal from the peripheral device 120 without a need to request to the captive portal. Furthermore, the communication module 261 can transmit instructions converted to a format that is compatible with the peripheral device 120 in accordance with the driver application for executing an input or output operation at the peripheral device 120. The instructions can include an identifier of the client device 110.

The driver application installing module 263 can use the web browser application or a mobile application to access an interface indicated in the link that facilitates installation of the driver application. The driver application installing module 263 can communicate with the communication module 261 to provide a request to download the driver application based on the link included in the captive portal. Once the driver application is downloaded via the communication module 261, the driver application installing module 263 can install the driver application designated by the peripheral device 120.

The driver application executing module 265 can launch the driver application from the driver applications data store 281 based on the link included in the captive portal or an address (of a deep link) provided by the peripheral device. Upon the launch, the driver application executing module 265 can provide an interface of the driver application that enables the client device 110 to request an operation to the peripheral device, to upload data associated with the operation, and to download data associated with the operation. In one implementation, the driver application executing module 265 can present a web page or a location of the driver application specified by the link.

Figure 3:
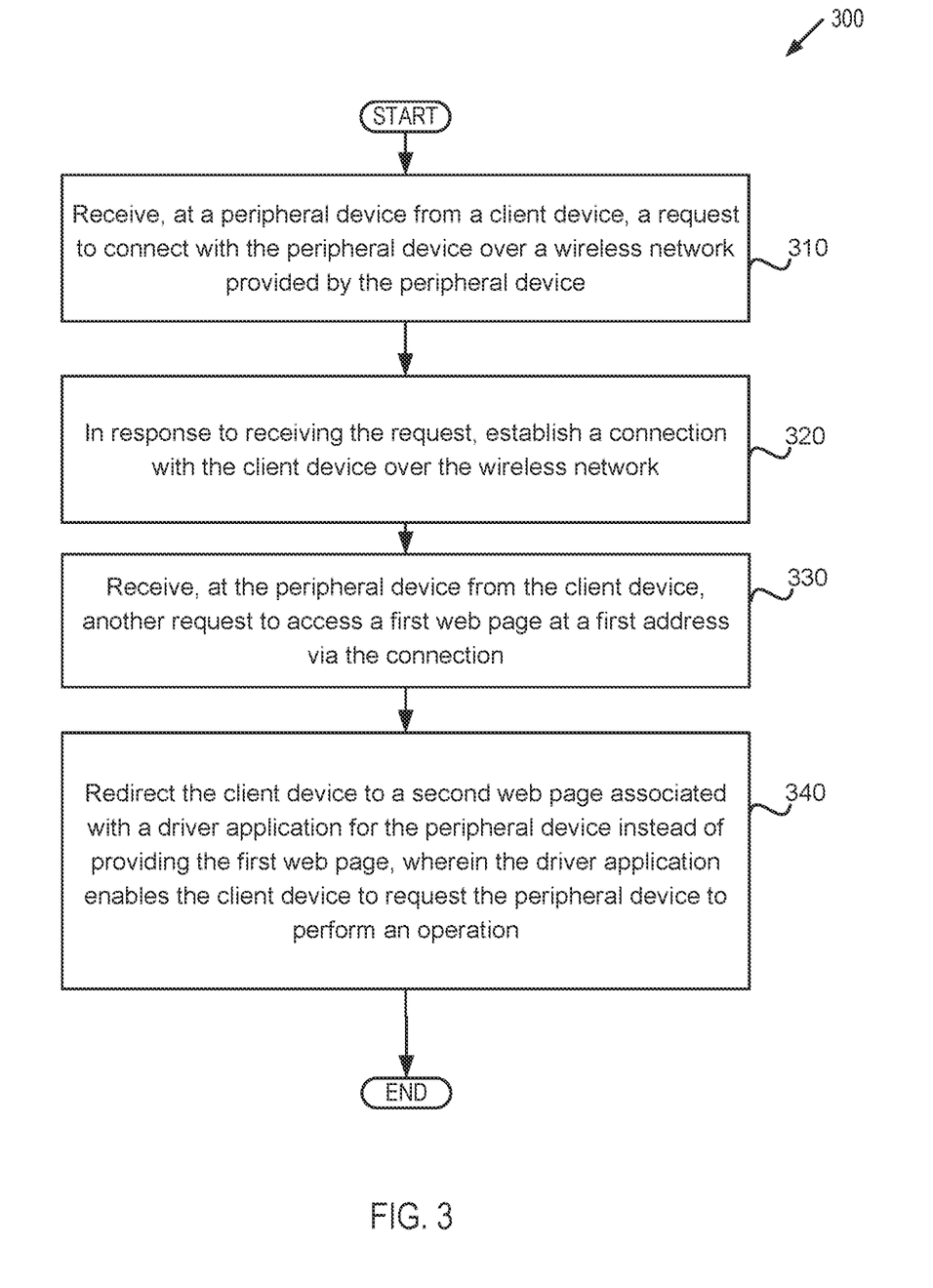
FIG. 3 is a flow diagram illustrating a method for facilitating an installation of a drive application in accordance with one or more aspects of the present disclosure.

FIG. 3 is a flow diagram illustrating a method 300 for facilitating an installation of a drive application in accordance with one or more aspects of the present disclosure. The method 300 may be performed by processing devices that may comprise hardware (e.g., circuitry, dedicated logic, programmable logic, microcode, etc.), executable code (such as is run on a general-purpose computer system or a dedicated machine), or a combination of both. The method 300 and its individual functions, routines, subroutines, or operations may be performed by one or more processors of the computer device executing the method. In certain implementations, the method 300 may be performed by a single processing thread. Alternatively, the method 300 may be performed by two or more processing threads, each thread executing one or more individual functions, routines, subroutines, or operations of the method. In an illustrative example, the processing threads implementing the method 300 may be synchronized (e.g., using semaphores, critical sections, and/or other thread synchronization mechanisms). Alternatively, the processes implementing the method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, the method 300 may be performed by the peripheral device 120 as shown in FIG. 1.

Referring to FIG. 3, the method 300 begins at block 310 where the processing device of a peripheral device (e.g., the peripheral device 120 of FIG. 1) receives, from a client device (e.g., the client device 110 of FIG. 1), a request to connect with the peripheral device over a wireless network provided by (or otherwise associated with) the peripheral device. Examples of the wireless network can include a peer-to-peer network based on Wi-Fi Direct, Bluetooth, or NFC technology. The processing device can receive, from the client device, a request to connect to the wireless network. In some embodiments, the client device can transmit a probe request that searches for a wireless network the client device can be connected to. Accordingly, once the client device is located within a vicinity of the peripheral device that is covered by the wireless network, the processing device can receive the probe request. In an embodiment, the client device can also provide an identifier (e.g., a media access control (MAC) address of the client device or any other unique identifier) of the client device along with or as a part of the connection request. In some implementations, such an identifier can later be used by the processing device in determining whether the driver application associated with the peripheral device is installed at the client device.

At block 320, in response to receiving the request, the processing device establishes a connection with the client device over the wireless network. In some embodiments, once the probe request is received, the processing device can respond to the probe request by notifying the client device of information (e.g., a name of the wireless network, supported data rates, encryption types, etc.) about the wireless network. Subsequently, the processing device can enable the client device to communicate over the wireless network provided by the peripheral device. In one implementation, the processing device can authenticate the client device before enabling the communication over the wireless network for a secure connection. For example, the processing device can request authentication information (e.g., a user identifier and a password) from the client device and verify the authentication information.

At block 330, the processing device receives from the client device another request to access a web page at an address. In some embodiments, the processing device can receive, from the client device, a request (e.g., an HTTP request) for a web page. The HTTP request can be in compliance with Wi-Fi Direct standard or any other standard (e.g., Bluetooth or near-field communication (NFC)) supported by the peripheral device that enables devices to directly communicate to each other over a wireless network, without an external access point (AP) or a wireless router. The processing device of the peripheral device can receive the request to access a web page via a web browser application of the client device. In other implementations, the processing device can receive the request of a web page via any other applications that are executed at the client device and that support communication with the peripheral device.

The received request can include an address of a web page. In some embodiments, the address can be expressed in a form of a uniform resource locator (URL). For example, the address can correspond to an address (e.g., http://www.abc.com) of a home page that is to be loaded as an initial web page when the web browser application of the client device is launched. In another example, the address can correspond to an address (e.g., http://manufacture.com) of a web page provided by the peripheral device when establishing a connection between the client device and the peripheral device over the wireless network. For example, upon granting the connection, the peripheral device can provide a particular web address for the client device to use as an initial request to access a web page.

At block 340, the processing device redirects the client device to a second web page associated with a driver application for the peripheral device instead of providing the first web page. A driver application can be a software application that enables the client device to request the peripheral device to perform an operation (e.g., an input and/or output operation). Examples of an input operation performed by the peripheral device can include sending a coordination information of a cursor on a display component of the client device, texts, image or video, voice signal, or data stored at the peripheral device to the client device.

Moreover, examples of an output operation supported by the peripheral device can include presenting an image received from the client device, playing an audio signal from the client device, and etc. Moreover, the driver application can convert data being communicated between the client device and the peripheral device to a format that is compatible with the respective device (either the client device or the peripheral device). As such, in some embodiments, a correct driver application should be installed at the client device in order to properly communicate with the printer.

In some embodiments, the redirected web page can include at least one of a link to download the driver application or another link to launch the driver application at the client device. In other words, the processing device can redirect the client device to a captive portal that facilitates a use of the driver application for the peripheral device.

A captive portal can be a web page that automatically opens in a web browser application at the client device when first connected to a network, or that opens when the web browser application is executed (e.g., when a user of the client device opens a web browser application and tries to visit a web page) before the client device can freely retrieve data through the network. In other words, the client device is "captive," or not able to freely access resources available via the wireless network provided by the peripheral device until the captive portal can be bypassed. Moreover, the captive portal can be provided to newly connected devices of the wireless network provided by the peripheral device. In one implementation, the address of the captive portal can be provided to the client device as a part of an HTTP redirect, in response to receiving an HTTP request to access a different web page. Furthermore, the captive portal can be stored at the peripheral device or a web server hosting the captive portal.

In some implementations, the captive portal can include a link to download the driver application and/or another link to launch the driver application at the client device. The link(s) can be in a form of a hyperlink or an interactive button. As for the link to download the driver application, the link can be associated with an address of a web page for downloading the driver application, or an address of a mobile application for downloading the driver application. For example, the web address can be for a web page (e.g., http://manufacture.com/printer driver) of a peripheral device's manufacturer or a web page (e.g., http://www.app-marketplace.com/details?id=manufacture.printer.driver) of an application marketplace for downloading the driver application. The application marketplace web page can be a web page associated with a database of applications that can be queried and downloaded. Once the link is activated (e.g., the link is selected by the client device) by the client device, the processing device can provide an address of the associated web page to the client device so that the respective web page can be opened in the web browser application of the client device. The address of a mobile application for downloading the driver application can correspond to an address of a mobile application (installed at the client device) for the application marketplace. The mobile application can supports searching and downloading other mobile applications to the client device. In one implementation, the link for the application marketplace application can be associated with or represent a deep link (e.g., appstore://manufacture_printer). A deep link can direct a device to a specific location of a respective application being executed at the device. In this case, the deep link can lead the client device to an interface provided by the application marketplace application for downloading the driver application.

With respect to another link provided on the captive portal for launching the driver application at the client device, the link can be associated with an address (e.g., a deep link URL address such as scan://devicename) of the driver application that triggers the driver application to be launched at the client device. Accordingly, upon receiving the link or receiving an input to select the link from a user at the client device, the respective driver application can be launched or invoked. In this way, the driver application can be kept turned off when not in use and executed when needed, instead of running at the client device all the time. Accordingly, any processing resources at the peripheral device, as well as any processing resources of the client device that are required to keep the driver application running may be saved.

In some embodiments, the processing device can determine whether the driver application associated with the peripheral device is installed at the client device before redirecting the client device to the captive portal. Depending on whether the driver application has been installed at the client device, the processing device can provide either the captive portal described above or an address associated with invoking the installed driver application.

In one implementation, the processing device can determining whether the driver application is installed at the client device based on an identifier (e.g., a MAC address of the client device or any other unique identifier) of the client device. For example, the processing device can determine whether the client device is included in a list of serviced devices for whom an operation is performed by the peripheral device, based on the identifier of the client device received from the client device. The processing device can receive the identifier of the client device from the client device with the data converted by the driver application to the peripheral device. In the alternative or additional embodiments, the processing device can receive the identifier of the client device when the client device requests the connection be established between the client device and the peripheral device, as described above with respect to block 310.

Once the processing device receives the identifier of the client device, the processing device can determine whether the client device can be found in the list of serviced devices for whom an operation is performed based on the received identifier. Accordingly, the list can be used by the peripheral device to confirm whether the driver application has been installed or executed at the client device, in the next time the client device provides a request to connect to the wireless network provided by the peripheral device. The processing device can add the identifier of the client device to the list when a request to perform an operation is received from the client device for the first time. As another example, the processing device can add the identifier of the client device to the list after performing an operation is requested by the client device for the first time. Yet as another example, the processing device can add the identifier of the client device to the list when the connection is first established between the client device and the peripheral device over the wireless network provided by the peripheral device.

In response to determining that the client device (i.e., the identifier) is included in the list, the processing device can determine that the driver application has been installed at the client device. On the other hand, in case the processing device determines that the identifier of the client device cannot be found in the list, the processing device can determine that the driver application is not installed at the client device.

In response to determining that the driver application is not installed at the client device, the processing device can provide the captive portal described above. On the other hand, in response to determining that the driver application is installed at the client device, the processing device can provide an address (included in an HTTP redirect message) that launches the driver application installed at the client device. Such an address can correspond to the deep link representing an address of the driver application that triggers the driver application to be launched at the client device, as described above.

In the alternative or in addition to block 340, the processing device can provide a web page for uploading data (e.g., a document to be printed, an audio or a video file to be played) for an operation to be performed at the peripheral device at the client device's request. The web page can be stored at the peripheral device. Such a web page can correspond to an interface of a cloud server that is communicatively coupled to both the client device and the peripheral device and also, stores uploaded data. Accordingly, the client device can access such a web page via the web browser application and upload data to the cloud server via the web page. Subsequently, the client device can request the cloud server to provide the uploaded data and to instruct the peripheral device to perform an operation (e.g., printing a document or playing an audio or video data) using the uploaded data. As another example, the client device can request the peripheral device to perform an operation (e.g., scanning a photo) via the web page and upload the data generated from the operation to the cloud server. Subsequently, the web page can present the uploaded data and enable the client device to select and download the data from the cloud server.

Figure 4:
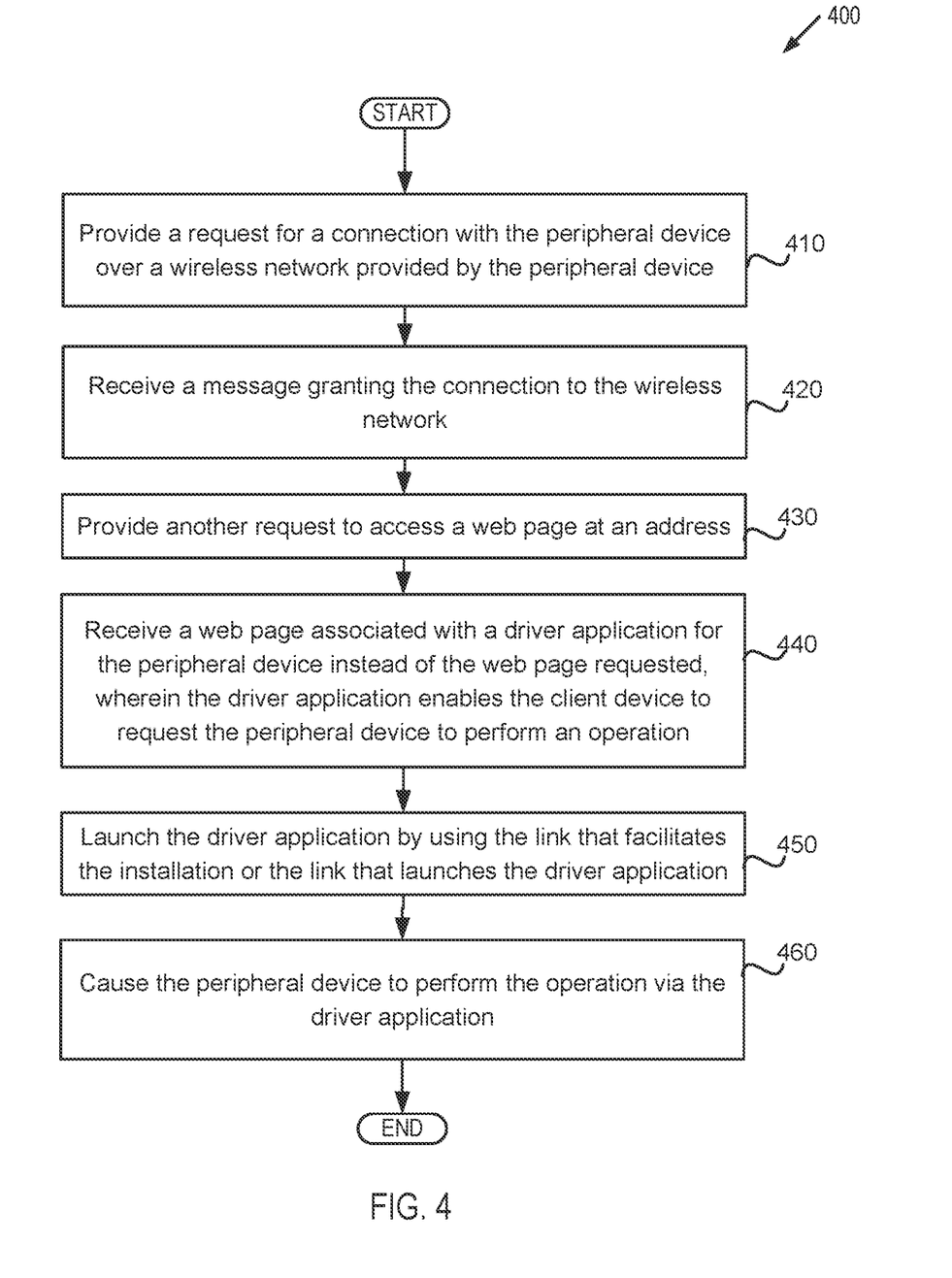
FIG. 4 is a flow diagram illustrating a method for causing a peripheral device to perform an operation in accordance with one or more aspects of the present disclosure.

FIG. 4 is a flow diagram illustrating a method 400 for causing a peripheral device to perform an operation in accordance with one or more aspects of the present disclosure.

The method 400 may be performed by processing devices that may comprise hardware (e.g., circuitry, dedicated logic, programmable logic, microcode, etc.), executable code (such as is run on a general-purpose computer system or a dedicated machine), or a combination of both. The method 400 and its individual functions, routines, subroutines, or operations may be performed by one or more processors of the computer device executing the method. In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processes implementing the method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, the method 400 may be performed by the client device 110 as shown in FIG. 1.

Referring to FIG. 4, the method 400 begins at block 410 where the processing device of the client device (e.g., the client device 110 of FIG. 1) provides a request for a connection with the peripheral device over a wireless network provided by the peripheral device. In one implementation, the processing device of the client device can transmit a probe request that searches for a wireless network the client device can be connected to. When the client device is located within a vicinity of the peripheral device that is covered by the wireless network, the processing device of the client device can provide the request to be connected with the peripheral device over the wireless network supported by the peripheral device. In an embodiment, the processing device of the client device can also provide an identifier (e.g., a media access control (MAC) address of the client device or any other unique identifier) of the client device along with or as a part of the connection request.

At block 420, the processing device of the client device receives a message granting the connection to the wireless network. In one implementation, the processing device of the client device can receive a response (notifying the information (e.g., a name of the wireless network, supported data rates, encryption types, etc.) about the wireless network) to the probe request from the peripheral device. In some embodiments, the processing device of the client device can receive a request for authentication from the peripheral device. In response, the processing device of the client device can provide authentication information (e.g., a user identifier and a password) to the peripheral device. Once the authentication information is verified, the processing device of the client device can receive a message granting the client device an access to the wireless network provided by the peripheral device.

At block 430, the processing device of the client device provides another request to access a web page at an address. In some implementations, after the connection between the peripheral device and the client device is established, the processing device of the client device can transmit a request (e.g., an HTTP request or any other request HTTP request that is in compliance with Wi-Fi Direct standard or any other standard (e.g., Bluetooth or near-field communication (NFC)) supported by the peripheral device that enables devices to directly communicate to each other over a wireless network, without an external access point (AP) or a wireless router) that includes an address of a web page for access. Examples of the requested web page can be a home page (at http://www.abc.com, for example) that is to be loaded as an initial web page when the web browser application of the client device is launched, or a web page (at http://manufacture.com, for example) provided by the peripheral device when establishing a connection between the client device and the peripheral device over the wireless network as described above with respect to block 330.

At block 440, the processing device of the client device receives a web page associated with a driver application for the peripheral device instead of the web page requested. In one implementation, the processing device of the client device can receive the web page associated with the driver application can include a link that facilitates installation of the driver application and/or another link that launches the driver application installed at the client device, as described above with respect to block 340. The driver application corresponds to an application that, when running at the client device, can enable the client device to request the peripheral device to perform an operation and convert data transmitting to and from the peripheral device into an appropriate format that the respective device can understand. That is, the client device can subsequently request performance of operations at the peripheral device using an interface of the driver application.

At block 450, the processing device of the client device launches the driver application by using the link that facilitates the installation or the link that launches the driver application. In one implementation, the client device can receive input from a user of the client device selecting the link that facilitates the installation of the driver application. Accordingly, the client device can, for example, execute a web browser to load a web page for downloading the appropriate driver application for the peripheral device. In another example, the client device can execute a mobile application for the application marketplace described above for downloading the driver application. In another implementation, the client device can receive input from the user of the client device selecting the link that launches the driver application. As described above, the link can be associated with a deep link of the driver application to invoke a launch of the driver application that is already installed at the client device. Accordingly, upon receiving the input, the client device can present an interface of the driver application that can be used to request an operation to be performed at the peripheral device.

At block 460, the processing device of the client device causes the peripheral device to perform the operation via the driver application. In one implementation, after the driver application has been launched at the client device, the processing device of the client device can request the peripheral device to perform an input operation (e.g., scanning a photo and providing the scanned photo as an image file to the client device) or an output operation (e.g., printing a document for the client device). For example, the processing device can present an interface of the driver application that enables the user of the client device to indicate which operation be performed by the peripheral device and any associated data. The user can indicate, for example, an image file stored at the client device to be printed by the peripheral device on the interface of the driver application. In response, the processing device of the client device can convert any instructions for the printing operation and the image file into a format understandable by the peripheral device based on the driver application. The processing device of the client device can transmit the converted data to the peripheral device. In one implementation, the processing device can also transmit the identifier (e.g., the MAC address) of the client device with the converted data to the peripheral device.

Figure 5:
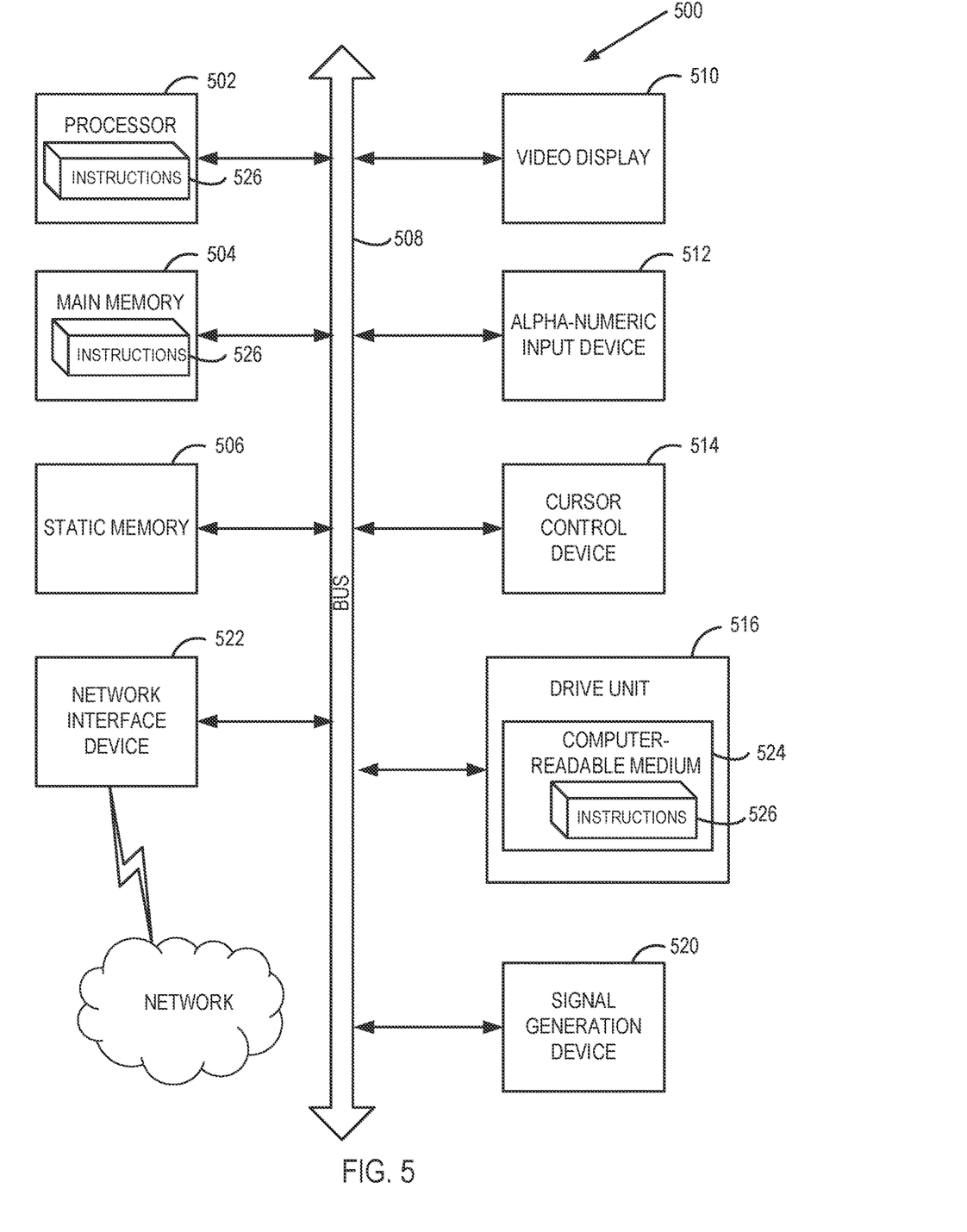
FIG. 5 illustrates an exemplary computer system in accordance with one or more aspects of the present disclosure.

FIG. 5 illustrates an exemplary computer system 500 in accordance with one or more aspects of the present disclosure. A set of instructions 526 included in the computer system 500 can cause the computer system 500 to perform any one or more of the methodologies discussed herein, may be executed. In alternative embodiments, the computer system 500 may be connected (e.g., networked) to other machines in a LAN, an intranet, an extranet, or the Internet. The computer system 500 may operate in the capacity of a server machine in client-server network environment. The computer system 500 may be a peripheral device as described above or a client device such as a laptop computer, tablet computer, mobile phone (e.g., smartphone), or any suitable computing device, or any machine capable of executing a set of instructions (sequential or otherwise) that specify actions to be taken by that computer system 500. Further, while only a single computer system is illustrated, the term "computer system" shall also be taken to include any collection of computer systems that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein with respect to methods 300 and 400.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the method 300 of FIG. 3 or the method 400 of FIG. 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the computer system 500 and that cause the computer system 500 to perform any one or more of the methodologies of the present invention. The term "computer-readable storage medium" shall accordingly be taken to include, but not be limited to, solid-state memories, optical media, and magnetic media.

While computer-readable storage medium 524 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Other computer system designs and configurations may also be suitable to implement the system and methods described herein. The following examples illustrate various implementations in accordance with one or more aspects of the present disclosure.

Unless specifically stated otherwise, terms such as "receiving," "establishing," "redirecting," "determining," "providing," "launching," "causing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   providing, by a client device, a first request for a connection with a peripheral device over a wireless network provided by the peripheral device;
   receiving a message granting the connection to the wireless network;
   providing a second request to access a first web page at an address;
   receiving a second web page associated with a driver application for the peripheral device instead of the first web page; and
   launching the driver application by using a first link that facilitates an installation of the driver application and a second link that launches the driver application.

2. The method of claim 1, wherein the first link is associated with a web address of a third web page for downloading the driver application or an address of a mobile application for downloading the driver application.

3. The method of claim 1, wherein the second link is associated with an address of the driver application that triggers the driver application to be launched at the client device.

4. The method of claim 1, wherein the second web page includes the first link and the second link.

5. The method of claim 1, further comprises:
   receiving an authentication request from the peripheral device; and
   providing authentication information to the peripheral device.

6. The method of claim 1, further comprises:
   transmitting, by the client device, a probe request to search for the wireless network; and
   receiving, from the peripheral device, a response to the probe request.

7. The method of claim 1, further comprises:
   presenting an interface of the driver application, the interface being used to request an operation to be performed at the peripheral device; and
   causing the peripheral device to perform the operation via the driver application.

8. The method of claim 7, further comprises:
   converting instructions for the operation into converted data converted for the peripheral device; and
   transmitting the converted data to the peripheral device.

9. A system comprising:
   a memory; and
   a processor, operatively coupled to the memory, the processor to:
   provide, by a client device, a first request for a connection with a peripheral device over a wireless network provided by the peripheral device;
   receive a message granting the connection to the wireless network;
   provide a second request to access a first web page at an address;
   receive a second web page associated with a driver application for the peripheral device instead of the first web page; and launch the driver application by using a first link that facilitates an installation of the driver application and a second link that launches the driver application.

10. The system of claim 9, wherein the first link is associated with a web address of a third web page for downloading the driver application or an address of a mobile application for downloading the driver application.

11. The system of claim 9, wherein the second link is associated with an address of the driver application that triggers the driver application to be launched at the client device.

12. The system of claim 9, wherein the second web page includes the first link and the second link.

13. The system of claim 9, wherein the processor is to further:
receive an authentication request from the peripheral device; and
provide authentication information to the peripheral device.

14. The system of claim 9, wherein the processor is to further:
transmit, by the client device, a probe request to search for the wireless network; and
receive, from the peripheral device, a response to the probe request.

15. The system of claim 9, wherein the processor is to further:
present an interface of the driver application, the interface being used to request an operation to be performed at the peripheral device; and
cause the peripheral device to perform the operation via the driver application.

16. The system of claim 9, wherein the processor is to further:
convert instructions for the operation into converted data converted for the peripheral device; and
transmit the converted data to the peripheral device.

17. A non-transitory computer readable storage medium comprising instructions that, when executed by a processor, cause the processor to:
provide, by a client device, a first request for a connection with a peripheral device over a wireless network provided by the peripheral device;
receive a message granting the connection to the wireless network;
provide a second request to access a first web page at an address;
receive a second web page associated with a driver application for the peripheral device instead of the first web page; and
launch the driver application by using a first link that facilitates an installation of the driver application and a second link that launches the driver application.

18. The non-transitory computer readable storage medium of claim 17, wherein the first link is associated with a web address of a third web page for downloading the driver application or an address of a mobile application for downloading the driver application.

19. The non-transitory computer readable storage medium of claim 17, wherein the second link is associated with an address of the driver application that triggers the driver application to be launched at the client device.

20. The non-transitory computer readable storage medium of claim 17, wherein the second web page includes the first link and the second link.

* * * * *